July 1, 1969

E. EVALDS 3,453,450

TEMPERATURE CONTROL CIRCUIT WITH PHOTO-SENSITIVE
COUPLING TO OUTPUT LOAD

Filed Aug. 5, 1966

INVENTOR.
EGILS EVALDS

BY
William E. Cleaver
ATTORNEY

United States Patent Office 3,453,450
Patented July 1, 1969

3,453,450
TEMPERATURE CONTROL CIRCUIT WITH PHOTO-SENSITIVE COUPLING TO OUTPUT LOAD
Egils Evalds, Ardmore, Pa., assignor to Athena Controls Incorporated, a corporation of Pennsylvania
Filed Aug. 5, 1966, Ser. No. 570,543
Int. Cl. H03k 17/14
U.S. Cl. 307—253     8 Claims

ABSTRACT OF THE DISCLOSURE

The present network provides a senser circuit whose signal is coupled to control an output circuit through a photo-sensitive device. In addition, the network provides a feedback signal to the senser circuit through a second photosensitive device. Further, the present system provides a control signal which is proportional in amplitude to the amount of heat needed at any given time so that the first photo-sensitive device which acts in conjunction with other circuitry to directly provide heat acts to provide heat on a proportional basis. In addition the present network provides an entirely electronic switching, sensing and control means so that the response is truly analog or proportional.

---

Figure 1:
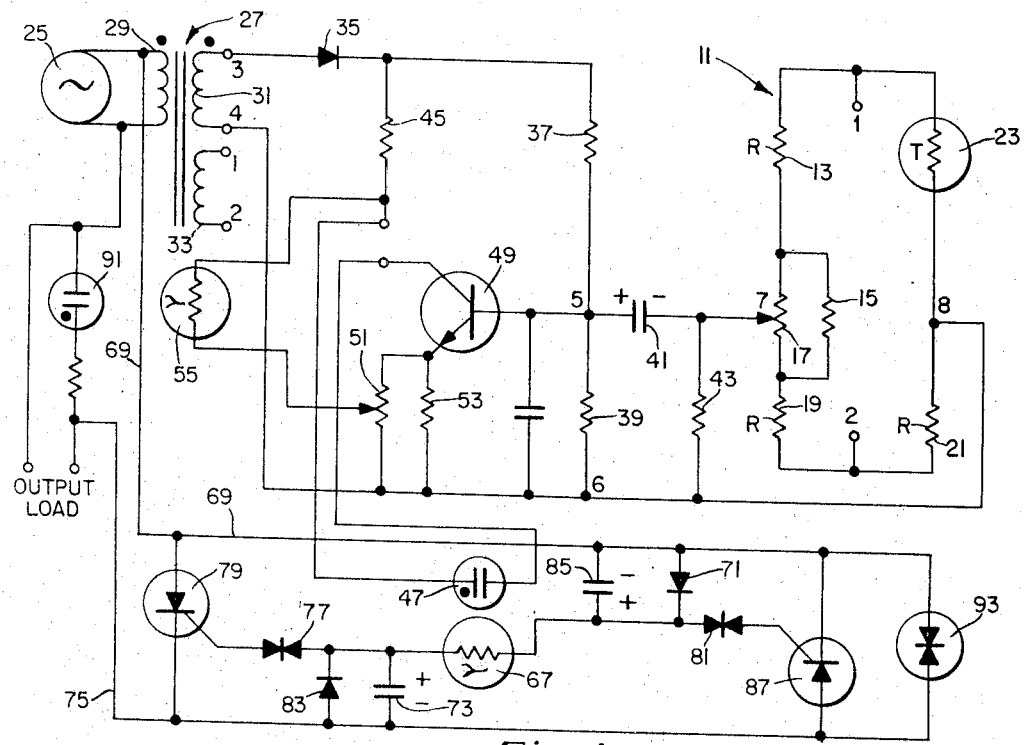

This invention relates to control apparatus used to control a system operation in response to varying temperature conditions related to said system.

While this invention is described in connection with heating or electrical power apparatus, it should be understood that it can be readily employed for controlling the liquid levels of a system or for controlling a system whereby an input signal or monitoring signal might vary in response to the performance of the system.

In prior art temperature sensitive control circuits it has generally been the practice to fabricate the sensing element, very often a thermocouple, as an integral part of an output circuit. For the most part this practice has been satisfactory since many of the temperature sensitive control circuits are employed to maintain furnaces at preselected levels of heat.

However, with the demand for more flexible temperature sensitive control equipment and more sophistication as to the utility of such equipment, the practice of connecting the sensor into the output circuit has proven unsatisfactory and in given instances, it has proven dangerous. The requirement of permitting the user to handle the sensor and physically locate it for various applications has become an ever increasing reality.

Accordingly, it is an object of this invention to provide a temperature sensitive control circuit which can be handled by the user with a minimum of danger as related to the output circuit which it is controlling.

In addition, temperature sensitive control circuits have continually been designed to provide the proper sensitivity and response to particular conditions of a system. The heating phenomenon, being what it is, very often provides a condition wherein there is an inertia of heat when it should have been terminated and a slow response to generate heat when it is wanted.

The present invention operates to anticipate the threshold of heat and "no heat" and to thus control the generator well in advance of the system's reaching the threshold.

Accordingly, it is another object of the present invention to provide a temperature sensitive control circuit which has improved sensitivity and response to temperature parameters.

In accordance with the present invention there is provided a sensor circuit whose output signal is coupled to control an output circuit through a photosensitive device.

In accordance with another feature of the present invention, the system output circuit provides a feedback signal to the sensor circuit through a photosensitive device.

In accordance with yet another feature, the present invention provides means for adjustably setting both the output signal from the sensor circuit and the feedback signal from the system output circuit to enable preselected levels of control to dominate the operation.

In addition the present invention features an output circuit which requires a minimum of power to be initiated into action.

The foregoing objects and features of the present invention will be better understood by reference to the following description in conjunction with the accompanying drawings in which:

FIGURE 1 is a schematic drawing of the circuit of the present invention; and

Figure 2:
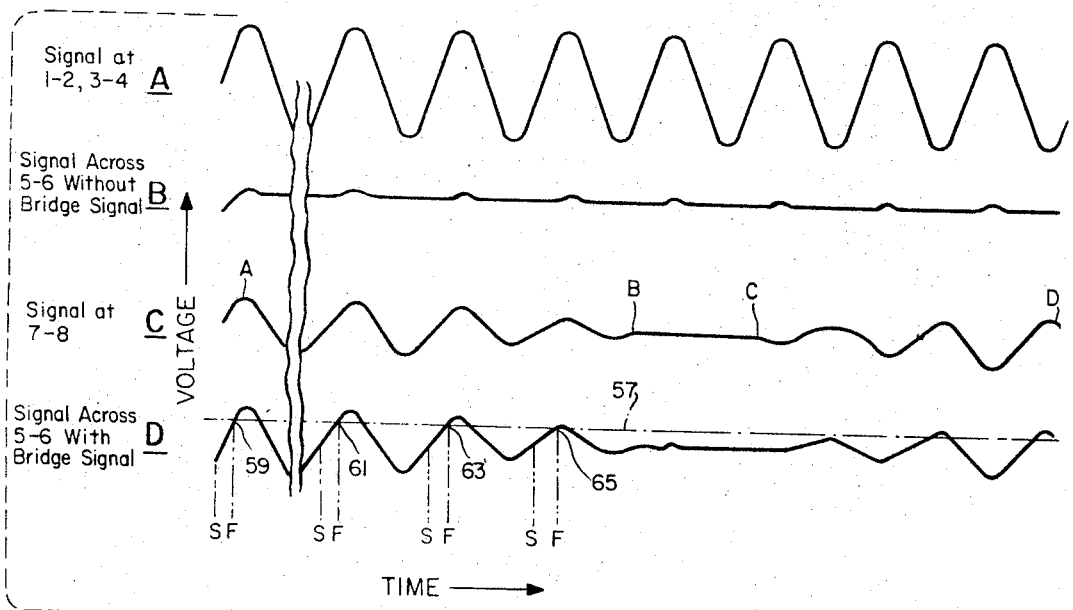

FIGURES 2, A, B, C and D are graphic displays of the signal condition at significant points in the circuit.

In general the circuit operates by employing a thermistor as the sensor, or sensing element. While a thermistor is employed as the sensor in the preferred embodiment, it should be understood that any element whose resistance might change in response to a condition of control might be used in the present circuit. Since the preferred embodiment of the present invention is used in a flexible application, wherein the user physically handles the sensor, a thermistor is highly desirable.

The thermistor is connected as one leg of a Wheatstone Bridge, operating in an A.C. mode. Connected to the output of the bridge circuit is a transistor amplifying circuit which has a first lamp connected in its collector circuit.

When the thermistor is cold (and its resistance is high) the output of the bridge circuit is in phase with the input signal applied to the emitter-collector of the transistor. Accordingly, the transistor conducts, providing a pulsating D.C. signal through the first lamp.

The first lamp in turn is disposed in close proximity to a first photosensitive device in the system output circuit. When the first lamp is illuminated the first photosensitive device has a low resistance. By design, the first photosensitive device will be characterized by a low resistance, having once been subject to the illumination, for at least one full cycle of the input signal. In affect, the first photo-sensitive device "remembers" its condition for at least one cycle of the input signal.

The system output circuit features two silicon controlled rectifiers which are connected in an inverse parallel made so that they are respectively capable of conducting on alternate halves of an A.C. signal. The system output circuit is subject to an A.C. input signal and if the first photosensitive device is in its low resistance state, the silicon controlled rectifiers (hereinafter referred to as (SCR's) are fired to pass the A.C. input signal to the output load. On the other hand, if the first photosensitive device is operating in its high resistance condition, the SCR's do not fire and there is no passing of the input signal to the output load.

The present circuit can be adjusted to control the time, during the input cycle, at which the SCR's will fire and hence the output power can be held to a discrete value. Since the firing time is varied as the system nears the control limitations of operation, the system condition can be held in its preferred state.

As part of the means for adjustably controlling the output power, the system output circuit includes a feedback circuit whose output element is also a lamp hereinafter identified as the second lamp. The illumination from this last mentioned lamp affects a second photosensitive device which is connected across the collector-emitter elements of the transistor. In response to a variation of the resistance of the second photosensitive element the voltage drop across the transistor varies which in turn regulates the current flowing therethrough.

A variation of the current flow through the transistor will create a variation in the illumination of the first lamp and accordingly will alter the time of firing the SCR's, as will become apparent below.

Consider now in detail the operation of the circuit.

In FIGURE 1, there is depicted a bridge circuit 11. The bridge circuit 11 is made up of resistors 13, 15–17 and 19 on one side and resistor 21 and thermistor 23 on the second side.

On the left hand side of FIGURE 1 there is shown an A.C. source 25, coupled to a step down transformer 27 through a primary winding 29. The secondary windings 31 and 33 of the transformer 27, respectively supply power to the synchronous, amplifying circuit and the bridge circuit 11. In the preferred embodiment, the A.C. source is standard 60 cycle, 115 volts. The secondary stepped down to supply approximately 100 v.

Consider the signal condition of the amplifying circuit without the bridge in operation by examining FIGURE 1 and FIGURES 2, A and B.

When an A.C. signal is applied to the primary winding 29, there appears a similar A.C. signal on the secondary windings 31 and 33. Such a signal is graphically shown in FIGURE 2A as being at points 1–2 and 3–4.

With respect to the signal at 3–4, it is rectified by diode 35 to provide a pulsating D.C. signal across the amplifying circuit including: the resistors 37 and 39 in series; resistor 37 in series with the capacitor 41 in series with resistor 43; resistor 45 in series with the lamp 47 in series with transistor 49 in series with parallel resistors 51 and 53; and of course resistor 45 in series with photosensitive device 55, in series with a tapped portion of resistor 51.

Once the signal is applied to the amplifying circuit, the resistor 37 acts with the capacitor 41 and resistor 43 to integrate the signal and provide a varying (but very close to steady) D.C. signal as shown in FIGURE 2B.

Capacitor 41 charges as shown in FIGURE 1 and discharges (during the negative half of the input signal) through resistor 39, as well as through transistor 49, to level off the difference of potential across resistor 39 and the parallel connected resistors 51 and 53.

The values of the resistors are chosen such that there is insufficient difference of potential across the base emitter junction of transistor 49 to cause transistor action during the above described condition (i.e., without the bridge in the circuit). However, the D.C. signal does provide a pedestal which enables the transistor 49 to be turned on more readily.

If we consider that the thermistor 23 is in a cold state and hence with its resistance high, it is apparent that the voltage across the bridge output points 7–8 is in phase with the input signal. The foregoing is true because the ratios of the resistors are chosen so that they will be equal on either side of the bridge for a null condition, in accordance with well known bridge circuit operation.

The signal across points 7–8 is depicted in FIGURE 2C. Actually all of the figures of FIGURE 2 are broken indicating that there are many such cycles preceding the time of the graphic illustration.

With the thermistor in a cold state, the system would operate with a positive signal appearing across the points 7–8, which is in phase with the input signal across the collector-emitter of transistor 49. The positive signal experienced at points 7–8 is added to the charge on capacitor 41 to provide the signal shown in FIGURE 2D.

If we assume that there is a threshold signal above which transistor 49 will conduct and that such a threshold level is shown by the dashed-dot line 57, then it becomes apparent that transistor 49 will be turned on at times 59, 61, 63 and 65. With transistor 49 turned on (there being a proper difference of potential from collector to emitter during the foregoing times) the lamp 47 is illuminated. In response to the illumination of lamp 47, the photosensitive device 67 operates in a lower resistance mode. Hence for the same positive swing of input signal that turned on transistor 49, there is a signal along lead wire 69, through diode 71, through photosensitive device 67 to charge up capacitor 73. When capacitor 73 is sufficiently charged, the trigger diode 77 is fired which in turn fires SCR 79. Since an SCR will respond to a sharp signal, the trigger diodes 77 and 81 are employed. The trigger diodes generate sharp signals in response to very little input signal.

When SCR 79 is fired, it acts similar to a thyratron and continues to conduct until the voltage swing on lead wire 69 goes negative, which cuts off SCR 79. However, when the voltage swing on lead wire 69 goes negative, the voltage swing on line 75 goes positive and there is current flow along lead wire 75, through diode 83, through photosensitive device 67, to charge up capacitor 85 (as shown). When capacitor 85 gets to the proper charge, it fires the trigger diode 81 which in turn fires the SCR 87. Hence there is a full cycle of output signal to the load having once fired the transistor 49.

It should be apparent that the transistor 49 was not conducting during the negative half of the input signal and hence the lamp 47 was not illuminated. While the foregoing is true, it will be recalled that the photosensitive device 67 was chosen to "remember" for at least one cycle, i.e. to operate in its lowered resistance state for at least one input cycle after having been so conditioned. Since the photosensitive device remains in its lowered resistance state during the negative half of the input signal, the SCR 87 will conduct. During the next positive cycle, the transistor conducts again and the process repeats itself.

FIGURE 2C depicts a varying condition of the sensor. From points A (over a long period depicted by the break in the graph) to B the sensor as been cold but is tending toward becoming heated to the critical temperature. Note how the voltage amplitude decreases. When the voltage signal depicted in FIGURE 2C is added to the voltage shown in FIGURE 2B there results the signal of FIGURE 2D going below the threshold after time 65. From the period B to C on FIGURE 2C the bridge is in a null condition. Note from FIGURE 2D that the transistor is not conducting because the signal of FIGURE 2D is below the threshold line 57.

Finally from points C to D the sensor has become warm to the point where its resistance is low and the output signal from the bridge is out of phase with the system input signal. During this last period there will be no transistor action because when the threshold is reached (on FIGURE 2D) the system input signal is reverse biasing the collector-emitter of the transistor 49.

Note also in FIGURE 2D that the time from the cycle start (S) until time (F), at which the transistor conducted, increased as the sensor became more heated. By this control the power output is reduced and if we recall that the load is a heating system, the reduced power output is desired result. A similar control is attained by the feedback circuit from the system output circuit. When the output signal is provided at its desired level, it causes lamp 91 to be illuminated. Lamp 91 in turn causes the photosensitive device 55 to operate with a lower resistance. The lower resistance of photosensitive device 55 causes current to bypass the transistor 49 and raise the voltage value of the emitter thereof. This last condition causes the transistor 49 to conduct at a relatively lower current than without the bypass. With transistor 49 conducting with a lower current, the lamp 47 is illuminated at a lower value of light and the resistance of photosensitive device 67 is relatively high. Hence the R-C time constant for firing the SCR's is longer. The longer R-C time constant in the system output circuit reduces the output power by causing the SCR's to fire at a discrete time after the input signal has begun. If for some reason the value of the output power decreases it is reflected through the lamp 91 by causing less illumination. Less illumination from lamp 91 will cause an operation in the opposite direction from that just described with a resultant increase in power.

The adjustable taps on resistors 51 and 17 enable the user to define the limits of power output and temperature thresholds by which he wants to control the system. It should also be apparent that if there is a short in the switching circuit or the bridge circuit, with which the user might come in contact, the voltages will be low.

In FIGURE 1 there is also shown a surge suppressor diode 93 which serves to protect the SCR's from transient signals or high signal surges that might burn out the SCR's.

It becomes apparent that the present invention provides a sensor device which can be readily handled by the user because it is isolated from the output signal hardware of the system through a photosensitive device. The present invention further provides two adjustable controls, one of which enables the user to define high temperature limits and to gradually reduce or increase his output power in accordance with an approach to the temperature limits. The second adjustable control enables the user to control his output signal to the lead by monitoring his output signal, irrespective of the temperature control.

Finally the present invention employs trigger diodes in conjunction with SCR's to take advantage of the lower power consumption in the control signal itself.

Throughout, the devices 67 and 55 have been identified as photosensitive devices. In the preferred embodiment they are type NSL 15 P, manufactured by National Semiconductors Ltd.

While the foregoing description sets forth a principle of the invention in connection with specific apparatus, it is to be clearly understood that this description is made only by way of example and not as a limitation to the scope of the invention as set forth in the objects thereof and in the accompanying claims.

What is claimed is:

1. A control signal network for controlling an electrical system comprising in combination:
    (a) first sensing means whose electrical resistance characteristic varies in response to predesignated conditions of said electrical system and which provides sense output signals which reflect said electrical resistance characteristic;
    (b) first light generating means;
    (c) first electronic switching means including first bias means;
    (d) half-wave rectification means;
    (e) first circuitry means connecting said half-wave rectification means and said first electronic switching means to said first light generating means;
    (f) second circuitry means connecting said first sensing means to said first bias means to proportionately turn on said first electronic switching means through said first bias means in response to said sense output signals whereby light emission from said first light generating means is proportional to said sense output signals;
    (g) first semiconductor light sensitive means having a variable electrical resistance characteristic which is responsive to different degrees of incident light and which retains any resistance value to which it is changed in response to said incident light for at least a time period equal to the time period to which it has been exposed to said incident light, said first semiconductor light sensitive means disposed in close proximity to said first light generating means to receive said proportional light emitted therefrom; and
    (i) output signal means connected to said first semiconductor light sensitive means to provide an A.C. output signal in response to the electrical resistance characteristics of said first light sensitive means.

2. A control signal network according to claim 1 wherein said first sensing means includes a bridge circuit and said second circuitry means includes an integrating circuit.

3. A control signal network according to claim 2 wherein said first electronic switching means includes a transistor having input, output and control elements and wherein said first bias means is connected across said integrating circuit.

4. A control signal network according to claim 1 wherein said output signal means has an electrical supply connected thereto and at least includes control electron conducting means which conduct continuously after having once been started until the electrical supply thereto is cut off.

5. A control signal network according to claim 4 wherein said output signal means further includes signal triggering means which provide a sharp output signal in response to a threshold input signal, and threshold signal means to develop the threshold signal for said triggering means, said triggering means connected to said controlled electron conducting means and said threshold signal means connected to said triggering means.

6. A control signal network according to claim 1 wherein said output signal means includes a second light generating means connected to monitor output signals from said output signal means and wherein said first circuitry means includes a second semiconductor light sensitive means which is disposed in close proximity to said second light generating means, said second semiconductor light sensitive means connected in said first circuitry means to act as a second bias means to bias said first electronic switching means.

7. A control signal network according to claim 6 wherein said first electronic switching means includes a transistor amplifier and wherein said first light generating means is connected as the load of said transistor and said second semiconductor light sensitive means is connected across said transistor and said load.

8. A control signal network according to claim 6 wherein said first circuitry means includes an adjustable resistor means which is connected to said second semiconductor light sensitive means to provide a second bias means which is adjustable.

References Cited

UNITED STATES PATENTS

| | | | |
|---|---|---|---|
| 3,111,008 | 11/1963 | Nelson | 328—3 XR |
| 3,161,759 | 12/1964 | Gambill et al. | 219—502 XR |
| 3,235,711 | 2/1966 | Bergen et al. | 307—252 XR |

JOHN S. HEYMAN, *Primary Examiner.*

JOHN ZAZWORSKY, *Assistant Examiner.*

U.S. Cl. X.R.

219—499, 502; 307—252, 310, 311; 315—156; 328—3